April 25, 1933. W. M. SMITH ET AL 1,905,573
OIL WELL SURVEYING INSTRUMENT
Filed March 29, 1932 2 Sheets-Sheet 2

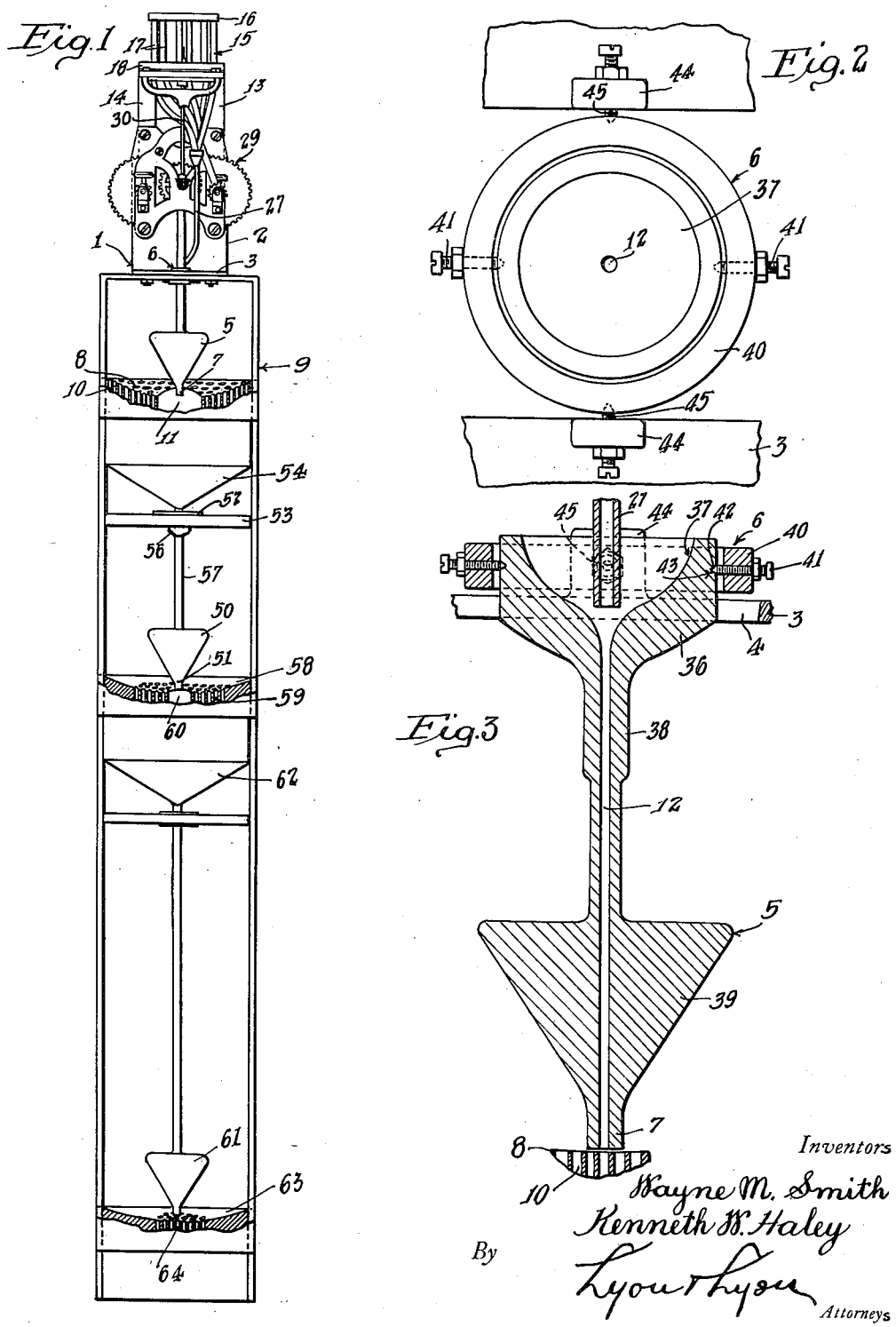

Inventors
Wayne M. Smith
Kenneth W. Haley
By Lyon & Lyon
Attorneys

Patented Apr. 25, 1933

1,905,573

UNITED STATES PATENT OFFICE

WAYNE M. SMITH AND KENNETH W. HALEY, OF FELLOWS, CALIFORNIA

OIL WELL SURVEYING INSTRUMENT

Application filed March 29, 1932. Serial No. 601,814.

Our invention relates to oil well instruments, and has particular reference to a device for measuring the direction and angle of deviation of a well bore from the true vertical.

During the process of boring wells, such as an oil well, the penetration of the boring tools through various strata, causes deflection of the boring tool so that the bore, instead of extending along the true vertical as it should, becomes deflected and the bottom of the bore is sometimes disposed at a considerable distance from the true vertical line from the top of the well.

It is desirable that the location of the bottom of the well bore be accurately determined, and for this purpose surveying devices of the character described in our copending application, Serial No. 469,217, filed July 19, 1930, may be employed.

The device disclosed in that application comprised a means for measuring the angle of deflection and the direction of the deflection of the well bore. The present invention is an improvement upon the device disclosed in that application to render the same more accurate, and it is therefore an object of this invention to provide a device for measuring the deflection of a well bore in which a plurality of deflection measuring devices are employed, one of which measures great deflections, while the other measures lesser deflections so that small angles may be accurately measured.

Another object of the invention is to provide an attachment which may be employed with the measuring device disclosed in our former application, hereinbefore referred to, in which a plurality of successive angular measuring devices may be employed to accurately measure minute variations of the angle of the well bore from the true vertical.

Other objects and advantages will be apparent from a study of the following specifications, read in connection with the accompanying drawings, wherein Figure 1 is an elevational view of a well bore surveying instrument constructed in accordance with our invention;

Figure 2 is a detail plan view showing the mounting of one of the deflection measuring devices shown in Figure 1;

Figure 3 is a detail sectional view, through a plumb-bob employed in connection with the invention shown in Figure 1;

Figure 4:
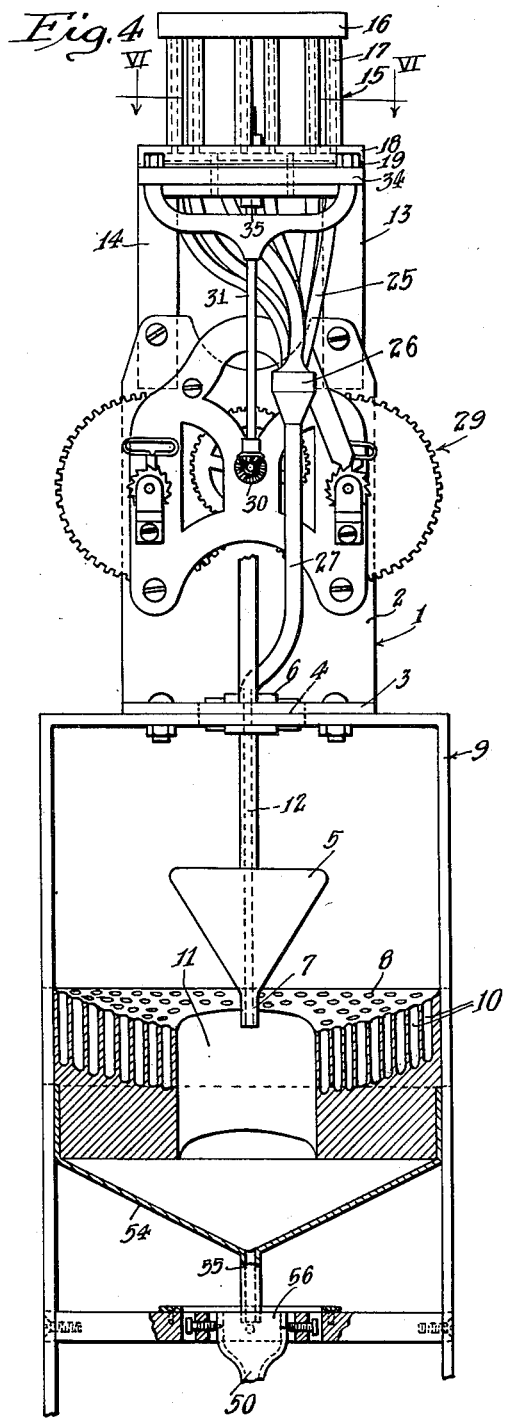
Figure 4 is a detail elevational view of one of the measuring devices shown in Figure 1.
Figure 5:
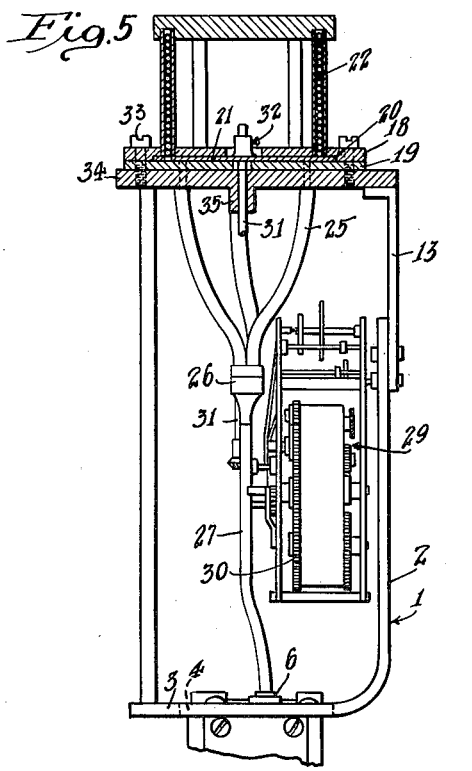
Figure 5 is a side elevational view of the measuring device shown in Figure 4.
Figure 6:
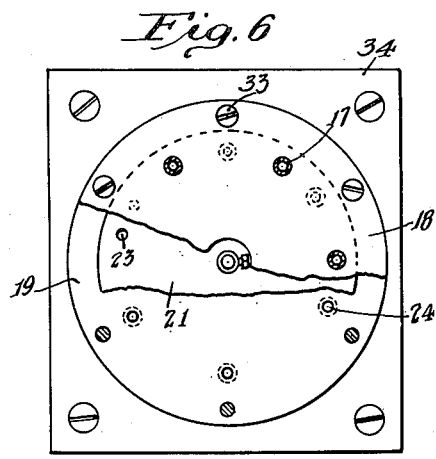
Figure 6 is a sectional view taken along line VI—VI of Figure 4.

In our copending application, Serial No. 469217, hereinafter referred to, we disclosed a well bore surveying instrument adapted to be attached to the lower end of a lowering device, such as a tool string commonly employed in connection with well bores, so that the instrument could be lowered into the bore to any predetermined length, and while the instrument is held stationary at such position, a measurement of the angle of deflection of the instrument from the true vertical is taken.

Thereafter the instrument may be lowered to a further position in the well and another deflection measurement taken so that the repetition of these steps will produce a complete reading of the angle of deflection of the bore from the true vertical throughout its length.

In accordance with the present invention, the instrument may comprise a frame 1 preferably formed from an angular plate 2 having a horizontally extending flange 3 formed thereon and having an opening 4 in the center of the flange. A plumb-bob 5 may be attached to the flange 3 as by mounting the same upon a universal mounting 6 secured within the opening 4 of the flange so that the plumb-bob is free to move in all directions to assume a true vertical position independent of the angular position of the plate 1.

The lower end 7 of the plumb-bob 5 is illustrated as traversing the upper surface of a base 8, which may be secured to the frame in any suitable manner, as by means of an elongated U-shaped yoke 9. The base member which we propose to use consists of a solid block 8, the upper face of which is formed with a concave surface paralleling the motion of the lower end of the plumb-bob 5. In this base 8 we provide a plurality of vertically extending bores 10 communicating with the upper concave surface of the base, there being a sufficient number of these bores to substantially cover the entire concave surface of the base with the exception of a central area 11.

Each of the bores constitutes an opening into which may be projected a recording device, such as a small pellet or ball, which may be dropped through a ball passage 12 extending through the vertical axis of the plumb-bob and terminating at the lower end thereof. Thus if the instrument is disposed at any great angle, the plumb-bob would position its opening or bore 12 over that one of the bores 10 in the base which represents a deflection of the same angle from the true vertical. However, as will be hereinafter more fully described, if the angle of deflection is only small, the plumb-bob will be positioned over the central opening 11 instead of over one of the perforations 10.

Since the perforations or openings to the bores 10 are arranged in all directions from the center of the concave surface 8, it is immaterial what the angular horizontal rotation of the instrument may be, and there will always be one of the openings in alignment with the lower end of the bore 12 of the plumb-bob 5. By measuring the angle through which the instrument has rotated, as will be hereinafter described, not only the magnitude of the angular deflection may be measured, but also the direction of the deflection may be recorded.

Secured to the frame 1 in any suitable manner, as by a pair of standards 13 and 14, we have illustrated a housing 15 for containing the pellets which are to be dropped into the bores 10. This housing 15 comprises a suitable supporting plate 16 equally spaced around which are a plurality of dependent tubes 17. The instrument described is represented as being provided with six of these depending tubes 17, though it is to be understood that any suitable number may be provided. The tubes terminate in a base plate 18 to which is attached a second plate 19, there being a countersunk opening 20 in the plate 18 to permit of the rotation therein of a disc 21. The disc 21 is provided with a single opening 23 of such size as to allow one of the pellets 22 to pass into the disc 21 as the opening 23 is aligned with any one of the tubes 17.

The plate 19 is perforated with a series of openings 24 extending vertically therethrough, there being a number of openings 24 equal to the number of tubes 17, the openings 24 being annularly aligned with the tubes 17 but angularly disposed with reference thereto so that upon rotation of the disc 21 to pick up one of the pellets from one of the tubes 17, the disc must rotate through a further angle before the opening 23 in the disc 21 is aligned with the associated opening 24 in the plate 19. Thus one pellet at a time is selected from one of the tubes 17 and is passed to its associated opening 24 in the plate 19, and then the disc 23 selects a pellet from the next tube in the direction of its rotation.

All of the openings 24 in the plate 19 are connected by means of suitable tubes or passages 25 with a funnel-like collector 26 so that pellets selected from any one of the tubes 17 will be dropped into the collector 26, from whence the pellets will pass through a single tube 27 which extends from the collector 26 to a point immediately above the plumb-bob 5.

The disc 21 may be rotated in any suitable manner but is preferably rotated at a constant speed by means of a suitable clockwork 29, which drives through suitable gearing 30 a shaft 31 which extends upwardly through the plate 19 to engage the plate 21 to which it is secured by means of a suitable attaching device or set screw 32. The clockwork 29 may continuously rotate the disc 21 or may be arranged to move the plate 21 intermittently through a predetermined portion of a complete rotation, as may be desired, the only requisite being that there must be a timed relation between the passage of the opening 23 in the plate 21 past the various tubes 17 so that the pellets selected will be dropped through the tube 27 at the expiration of predetermined timed intervals.

The housing 15 for the pellets 22 may be suitably secured as by screws 33 to a supporting base 34 which is attached to the supports 14, and a boss 35 may be formed on the plate 34 to act as a stiffening bearing for the shaft 31.

In operation the device thus far described causes one of the pellets 22 to be selected and dropped through the plumb-bob at successive timed intervals, these timed intervals being preferably such as to permit the movement of the entire instrument from one position in which it is to record the angle of inclination to a second position at a different depth in the bore so that the dropping of the pellets always occurs when the instrument is at rest at a desired level in the bore.

Referring particularly to Figure 3, it will be observed that the plumb-bob 5 comprises an enlarged head 36 which is bored as at 37 to provide a funnel-like entrance to the passageway 12 which extends downwardly through the shaft 38 of the plumb-bob structure. The lower end of the plumb-bob is formed with an enlarged portion 39 to provide the necessary weight upon the lower end of the plumb-bob to insure its ready movement to a true vertical position, the enlarged portion 39 being tapered to terminate in a relatively narrow end or point 7 which can be aligned with any of the bores 10 in the base 8.

The support 6 for the plumb-bob 5 may be made in any suitable manner, though we have illustrated the same as comprising an annular ring 40 having trunnion screws 41 extending radially therethrough at diametrically opposite sides of the ring. The trunnions 41 may terminate in sharpened points 42 which enter and fit conical shaped openings 43 in the enlarged portion 36 of the upper part of the plumb-bob. The form of bearing thus described may be substituted for by suitable jeweled bearings of the type well known in the construction of measuring instruments. The annular ring 40 may be supported upon the flange 3 of the frame 1 by means of suitable lugs 44 secured in any suitable manner to the flange 3 so as to act as supports for trunnion bearing members 45. The trunnion bearing members 45 engage conical shaped depressions in the annular ring 40, which are disposed at points substantially 90 degrees spaced from the trunnions 41. The pellets are preferably each distinguished from the others by means of a suitable characterizing mark such as by inscribing a number or other suitable character upon the pellet.

For example, the pellets may comprise tiny steel balls, on the surface of which is inscribed either by engraving or etching a suitable number distinguishing that ball from all of the remainder. Thus the number of the ball which is found in any opening 10 in the base 8 when the base is withdrawn identifies the ball which was dropped at a certain time when the instrument was at a certain known depth.

As hereinbefore described, the plumb-bob 5 will remain in a true vertical position independent of the angular deflection of the yoke 9 and the base 8 so that the pellet which is dropped will pass into one of the openings 10 corresponding to that angle.

It will be observed that the over-all length of the plumb-bob 5 is relatively short so that this plumb-bob may be swung through relatively great angles. However, if at the time the pellet is dropped through the plumb-bob 5, the angle of deflection is only slight, the pellet will fall not into one of the openings 10 of the base 8 but will pass through the large central opening 11.

The purpose of permitting this pellet to pass through the opening 11 is that a minute deflection from the true vertical causes a minute variation of position of the plumb-bob 5, and hence the exact angle of this deflection is not accurately measured, there being a considerable margin of error due to the fact that the closest possible spacing of the bores 10 in the base 8 permits only the measurement of an angle of several degrees. It is, therefore, very desirable that the exact angle of deflection be measured, especially when this angle is small, and for this purpose we have provided a second plumb-bob 50 which is identical in all respects with the plumb-bob 5, except for the fact that its over-all length is considerably greater. For example, the over-all length of the plumb-bob 5 may be three inches in an instrument which is designed to operate in a three or four inch diameter well casing, while the plumb-bob 50 may be twice as long or six inches. It will be obvious that a small angle of deflection of the longer plumb-bob will cause its lower end 51 to assume a much greater lateral displacement than the same angle would displace the lower end of the plumb-bob 5.

The plumb-bob 50 is illustrated as being mounted upon a suitable universal mounting 52 which is supported upon a cross-bar plate 53 also secured at its opposite ends to the yoke 9. A funnel-like structure 54 is preferably provided immediately beneath the uppermost base 8 so that any pellets which are passed through the opening 11 will fall into the funnel structure 54, and thus be directed through a central passage tube 55 which extends from the apex of the funnel structure 54.

By referring particularly to Figure 4, it will be observed that the tube 55 terminates above the funnel-like upper end 56 of the plumb-bob 50 so that a pellet which falls through the opening 11 will pass into the upper end of the plumb-bob 50 and thence will pass downwardly through the axial opening 57 of that plumb-bob.

Immediately below the lower end 51 of the plumb-bob 50 is a second base 58 which again has its upper surface of concave configuration to parallel the movement of the lower end 51 of the plumb-bob 50. Also, this base 58 is provided with a plurality of vertically extending bores 59 substantially covering the entire area of the upper surface of the base 8 to receive pellets which may pass through the plumb-bob 50. Again, the central portion of the base 58 is provided with a relatively large passage 60 so that minute deflections of the plumb-bob 50 relative to the base 58 will cause the pellets to be passed through the central opening instead of into one of the recording bores 59.

With the construction thus far described, the plumb-bob 5 will measure relatively great angles of deflection, while minute angles of deflection will not be measured by the plumb-bob 5 and the pellets which pass through the plumb-bob 5 will pass on to the second recording device or base 58 so that the smaller angles will be measured by the longer plumb-bob 50.

However, to make the instrument still more accurate in the measurement of small angles of deflection, an additional structure of plumb-bob 61, funnel structure 62, and an additional base 63, may be provided to permit the pellets which pass through the central opening 60 of the intermediate base 58 to pass on through the plumb-bob 61 to record on the third base 63. The base 63 is similar in construction to the bases described hereinbefore being provided with recording bores 64 which will receive pellets passed through the central passage of the plumb-bob 61. Again the plumb-bob 60 is considerably greater in length than the plumb-bob 50. For example, with the dimensions of the plumb-bobs 5 and 50 as hereinbefore stated as three inches and six inches, the plumb-bob 61 may measure 12 inches so that a minute angle of deflection may be accurately measured.

It will therefore be observed that the instrument is adapted to measure minute angles of deflection, while at the same time the instrument will measure angles of great deflection, each of the plumb-bobs and its associated base embracing definite angular limits. Thus a single instrument can be employed to measure accurately all of the deflections of the well bore from the true vertical, the lowermost plumb-bob 61 merely measuring very small angles, and this plumb-bob alone would not be capable of measuring larger angles because, due to its great length, it has only a relatively small amount of movement. However, the intermediate plumb-bob 50 will measure greater angles of deflection but not the greatest angles, while the plumb-bob 5 will measure the greatest angles encountered in the surveying of a well bore.

As was described in our copending application hereinabove referred to, the entire instrument may be contained within a suitable housing or casing which is attached to a drill string so that the same may be lowered through the ordinary well casing or into a bore which is to be surveyed.

In making a survey with our instrument, the same procedure as was described in the above mentioned application may be followed, that is, the instrument may be connected to the drill string and lowered to a predetermined depth. At this time the instrument will be held stationary sufficiently long for the clockwork 29 to drop one of the pellets. During this pause in the lowering of the instrument, the angular rotation of the drill string may be measured by comparing the direction of the instrument as it started in the top of the well with the angle of rotation which the drill string makes in lowering to the first position. The instrument may then be lowered by further lowering the drill string, measuring the angle of rotation of the drill string during such lowering and stopping the lowering sufficiently long to permit the next pellet to drop down.

After the instrument has passed down through the complete bore, the instrument may be brought up to the surface and the position of the pellets may be noted so that the angle of rotation of the instrument during this downward passage may be plotted against the bores in the bases in which successive pellets are discovered and thus a complete plotting of the direction of the well bore may be completed.

While we have shown and described the preferred embodiment of our invention, we do not wish to be limited to any of the details of construction except as defined in the appended claims.

We claim:

1. In an instrument for measuring the angular deflection of bores, a frame to be lowered into the bore, means on said frame movable through a great arc relative to said frame for recording great angles of deflection, a second means movable through a lesser arc relative to said frame, and cooperating with said first named means for recording lesser angles of deflection.

2. In an instrument for measuring the angular deflection of bores, a frame to be lowered into the bore, said frame having a relatively small cross sectional area, means movably secured to said frame for movement through a relatively great arcuate path to traverse said area, a second means movably mounted upon said frame for traversing said area with a movement of lesser arc, means cooperating with said first named means for recording great angles of deflection, and means associated with said second named means for recording angles of deflection of said second named means of lesser extent when said first named means is traversing the central section of said area.

3. In an instrument for measuring the angular deflection of bores, a frame to be lowered into the bore, a base member on said frame having a plurality of recording openings therein substantially covering the entire area of said base member surrounding a large central opening therein, a plumb-bob mounted on said frame above said base freely movable to assume a true vertical position under the influence of gravity, said plumb-bob having an opening therethrough and means projectable through said plumb-bob into the openings in said base with which the plumb-bob is aligned at any given instant, a second plumb-bob mounted on said frame immediately below said central opening in said base, said last named plumb-bob being also freely movable to assume a true vertical position under the influence of gravity, and a second base cooperating with said last named plumb-bob and having a plurality of recording openings therein to receive the projected means passing through said central opening to record small angles of deflection.

4. In an instrument for measuring the angular deflection of bores, a frame to be lowered into the bore, a base member on said frame having a plurality of recording openings therein substantially covering the entire area of said base member surrounding a large central opening therein, a plumb-bob mounted on said frame above said base freely movable to assume a true vertical position under the influence of gravity, said plumb-bob having an opening therethrough and means projectable through said plumb-bob into the openings in said base with which the plumb-bob is aligned at any given instant, a second plumb-bob of greater length than the first plumb-bob mounted on said frame immediately below said central opening in said base, said last named plumb-bob being also freely movable to assume a true vertical position under the influence of gravity, and a second base cooperating with said last named plumb-bob and having a plurality of recording openings therein to receive the projected means passing through said central opening to record small angles of deflection.

5. In an instrument for measuring the angular deflection of bores, a frame to be lowered into said bore, a plurality of base members secured to said frame in vertical spaced relation to each other, each of said bases having a plurality of recording openings therein, the openings in the lowermost base covering the entire central area of that base and the openings in the remaining bases covering their areas exclusive of the central portions thereof, and each of said uppermost bases being provided with a central passage therethrough including said central sections, a plumb-bob for each of said bases freely movable under the influence of gravity to traverse the area of the associated bases, said plumb-bobs being of progressively increasing length as they are spaced downwardly on said frame, and each of said plumb-bobs having a central opening therethrough, and means projectable through said plumb-bobs into the openings of the associated bases whereby the recording of said projectable means with the recording openings in any of the said bases measures the angular deflection of the frame from the vertical.

Signed at Taft, California, this 25 day of February, 1932.

WAYNE M. SMITH.
KENNETH W. HALEY.